UNITED STATES PATENT OFFICE.

JOHN AKRILL, OF WILLIAMSBURG, NEW YORK.

IMPROVEMENT IN WORKING CLAY FOR POTTERY AND OTHER WARE.

Specification forming part of Letters Patent No. 8,280, dated August 5, 1851.

*To all whom it may concern:*

Be it known that I, JOHN AKRILL, of Williamsburg, Kings county, State of New York, manufacturer of clay goods, have invented, made, and applied to use a new and useful Improvement in the Tempering, Treatment, and Working of Clays by the Application of Heat during the Process of Mixing and Tempering; and I do hereby declare that the following is a full, clear, and exact description of the mode of operation and the effect of the same, and of the various uses to which I intend to apply the said improvement.

I take clay, ground and mixed with water in any usual manner, and pass it through the pug-mill to temper and thoroughly mix the same, and place any required quantity in a proper and convenient receptacle, which can be heated, either by steam or fire, to as near the boiling-point of water as may be. This may be done in a large cauldron, boiler, or any fit vessel, and the clay of the proper consistence when at or about the boiling-point of water is to be removed and rammed, pressed, or formed in any convenient manner to give it the shape required.

Having thus generally described the process, the effects, differences, and advantages of this mode of working as compared with the ordinary cold-working of clays are next to be set forth.

When clay worked by my process has been formed or molded the steam in the clay and water evaporating passes off through the outside, which of course makes the outside of the clay damp, while the outside confines the heat imparted by the process to the clay inside, thus causing the clay to dry inside before it dries outside, and entirely overcoming the greatest difficulty in the ordinary cold process—namely, that the clay dries on the outside before the inside is dry, thereby shrinking and cracking the outside—and also in the old process the outside drying prevents the vapor from going off from the inside, and the material is cold and evaporation is very slow. Again, in the old process the clay shrinks in drying from the loss of watery bulk, and is seldom, if ever, of the same size as it was originally molded; but it is to be distinctly understood that the point which gives value to my process is the fact that the hot moisture of the steam penetrates the particles of clay evenly, giving sufficient moisture to effect the plastic adhesion of the particles and comparatively easy working of the clay with a much less quantity of water than in the cold process. As a next consequence the lesser quantity of water fills so much less space in the clay that when this reduced quantity is evaporated by the heat the clay retains, the clay itself is not decreased in size by the loss of watery bulk that will cause shrinkage in drying and burning, so that no matter how large an article or parts are connected together the articles will not crack and break, as in the ordinary process; and, again, with the ordinary process the clay goods have to be dried sometimes for months before they are fit for burning, while in my improved process it is an advantage to put them in a warm kiln immediately, in order to keep up the heat that is already in the clay, and burn the articles as quickly as practicable. The same effects as previously described will be produced by heating the dry clay and then admitting sufficient steam to make the clay plastic and of the proper consistence for molding or forming the same.

It will be seen that my process of heating clay while working is equally applicable to making bricks, pottery, clay retorts, and every article of clay goods, and consequently no machinery or heating apparatus can be described or shown, as it must be varied according to the particular manufacture; and I do not mean to limit myself in this particular, but to use such means as may be best adapted to heating and working the clay for the particular purpose; nor do I mean to limit myself to the precise temperature of the clay, as that must be regulated by the kind of clay and the condition of the atmosphere, but to work the same at or about the boiling-point of water. Neither do I mean to limit myself to any peculiar clay, compounds of clay, or mixtures of clay and other substances. Therefore

What I claim as my invention, and desire to secure by Letters Patent of the United States, is—

The application of heat to clay during the process of mixing, working, or tempering the clay, so that it is raised to a heat at or about the boiling-point of water at the time of molding or forming the same, substantially as described and shown.

In witness whereof I have hereunto set my signature this 12th day of March, 1851.

JOHN AKRILL.

Witnesses:
W. SERRELL,
LEMUEL W. SERRELL.